United States Patent
Kim et al.

(10) Patent No.: US 10,191,330 B2
(45) Date of Patent: Jan. 29, 2019

(54) LIQUID CRYSTAL DISPLAY PANEL, FABRICATION METHOD THEREOF AND DISPLAY DEVICE

(71) Applicant: BOE TECHNOLOGY GROUP CO., LTD., Beijing (CN)

(72) Inventors: Heecheol Kim, Beijing (CN); Hyun Sic Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 5 days.

(21) Appl. No.: 14/895,091

(22) PCT Filed: May 5, 2015

(86) PCT No.: PCT/CN2015/078258
§ 371 (c)(1),
(2) Date: Dec. 1, 2015

(87) PCT Pub. No.: WO2016/095404
PCT Pub. Date: Jun. 23, 2016

(65) Prior Publication Data
US 2016/0342030 A1    Nov. 24, 2016

(30) Foreign Application Priority Data

Dec. 19, 2014   (CN) .......................... 2014 1 0806465

(51) Int. Cl.
*G02F 1/1337*     (2006.01)
*G02F 1/1341*     (2006.01)
(Continued)

(52) U.S. Cl.
CPC ...... *G02F 1/133753* (2013.01); *G02F 1/1341* (2013.01); *G02F 1/13439* (2013.01);
(Continued)

(58) Field of Classification Search
CPC ................................................. G02F 1/133707
See application file for complete search history.

(56) References Cited

U.S. PATENT DOCUMENTS 7,327,433 B2   2/2008   Miyachi et al.
8,339,557 B2   12/2012  Ishida
(Continued)

FOREIGN PATENT DOCUMENTS

CN         1641425 A      7/2005
CN       102033360 A      4/2011
(Continued)

OTHER PUBLICATIONS

International Search Report of PCT/CN2015/078258 in Chinese, dated Sep. 2, 2015 with English translation.
(Continued)

*Primary Examiner* — Edmond Lau
(74) *Attorney, Agent, or Firm* — Collard & Roe, P.C.

(57) ABSTRACT

A liquid crystal display panel, a fabrication method thereof and a display device are provided. The liquid crystal display panel comprises: an opposed substrate (10) and an array substrate (20) arranged opposite to each other, and a liquid crystal layer (30) filled between the opposed substrate (10) and the array substrate (20). Alignment films (40) having opposite friction directions are provided on opposing surfaces of the opposed substrate (10) and the array substrate (20), respectively. The liquid crystal display panel has a plurality of pixel units which are arranged in array, and each of the pixel units comprises two pixel regions (A, B) along the friction direction of the alignment film. In each of the pixel units, a surface of the opposed substrate (10) facing the liquid crystal layer (30) or a surface of the array substrate (20) facing the liquid crystal layer (30) within at least one of the two pixel regions is inclined, so that a mean value of included angles between long axes of liquid crystal mol- (Continued)

ecules in the liquid crystal layer within one of the two pixel regions and a horizontal plane where the opposed substrate (10) and the array substrate (20) are located and a mean value of included angles between long axes of liquid crystal molecules in the liquid crystal layer within the other of the two pixel regions and the horizontal plane where the opposed substrate (10) and the array substrate (20) are located has a same absolute value and a sum of zero.

20 Claims, 8 Drawing Sheets

(51) Int. Cl.
*G02F 1/1343* (2006.01)
*G02F 1/1333* (2006.01)

(52) U.S. Cl.
CPC ............ *G02F 2001/133357* (2013.01); *G02F 2001/133738* (2013.01); *G02F 2001/133761* (2013.01); *G02F 2001/133773* (2013.01); *G02F 2001/133776* (2013.01); *G02F 2201/121* (2013.01); *G02F 2201/123* (2013.01)

(56) References Cited

U.S. PATENT DOCUMENTS

| | | | |
|---|---|---|---|
| 2002/0008834 | A1 | 1/2002 | Suzuki |
| 2003/0025866 | A1* | 2/2003 | Kikkawa ............ G02F 1/133707 349/129 |
| 2009/0002612 | A1* | 1/2009 | Tamaki ............. G02F 1/133784 349/117 |
| 2014/0049735 | A1 | 2/2014 | Mo et al. |

FOREIGN PATENT DOCUMENTS

| | | |
|---|---|---|
| CN | 102629058 A | 8/2012 |
| CN | 104460116 A | 3/2015 |
| CN | 204256333 U | 4/2015 |

OTHER PUBLICATIONS

Notice of Transmittal of the International Search Report of PCT/CN2015/078258 in Chinese, dated Sep. 2, 2015.
Written Opinion of the International Searching Authority of PCT/CN2015/078258 in Chinese, dated Sep. 2, 2015 with English translation.
Extended European Search Report in European Patent Application 15797577.2 dated Jul. 17, 2018.

* cited by examiner

LIQUID CRYSTAL DISPLAY PANEL, FABRICATION METHOD THEREOF AND DISPLAY DEVICE

CROSS REFERENCE TO RELATED APPLICATIONS

This application is the National Stage of PCT/CN2015/078258 filed on May 5, 2015, which claims priority under 35 U.S.C. § 119 of Chinese Application No. 201410806465.6 filed on Dec. 19, 2014, the disclosure of which is incorporated by reference.

TECHNICAL FIELD

Embodiments of the present disclosure relate to a liquid crystal display panel, a fabrication method thereof and a display device.

BACKGROUND

At present, a liquid crystal display device has been widely used in various fields; the liquid crystal display device makes use of physical properties of liquid crystal molecules and applies a voltage to control the liquid crystal molecules to rotate, so that light can transmit the liquid crystal molecules to achieve the purpose of display. In both an ADvanced Super Dimension Switch (ADS) mode liquid crystal display device and an In-Plane Switching (IPS) mode liquid crystal display device, the liquid crystal molecules deflect in a horizontal direction and arranged in a certain direction under the applied voltage so as to implement image display, resulting in advantages such as wide view angle, fast response, and accurate color reproduction and so on.

As shown in FIG. 1, an existing liquid crystal display panel comprises: an opposed substrate 01 and an array substrate 02 arranged opposite to each other, and a liquid crystal layer 03 filled between the opposed substrate 01 and the array substrate 02. The array substrate 02 includes a base substrate 021, and a gate electrode 022, a gate insulating layer 023, a source and drain electrode 024 and a passivation layer 025 sequentially arranged on the base substrate 021; and the array substrate 02 further includes other layers such as an active layer, a pixel electrode layer, and a common electrode layer and so on, which are not shown in FIG. 1. The liquid crystal layer 03 comprises anisotropic liquid crystal molecules having a negative dielectric constant; alignment films 04 having opposite friction directions are coated on opposing surfaces of the opposed substrate 01 and the array substrate 02, respectively (arrows in FIG. 1 show the friction directions); the alignment film 04 makes the liquid crystal molecules be arranged orderly along a direction of a pre-tilt angle δ under initial conditions, and plays a role of making the liquid crystal display device have uniform brightness and high contrast.

Because the opposing surfaces of the opposed substrate 01 and the array substrate 02 are respectively coated with the alignment films 04 having opposite friction directions and the liquid crystal molecules in the liquid crystal layer 03 are arranged along the direction of the pre-tilt angle δ, included angles between long axes of the liquid crystal molecules in the liquid crystal layer 03 and a horizontal plane where the opposed substrate 01 and the array substrate 02 are located are along a same direction, so that the liquid crystal molecules only have one tilt state. In this case, phase delays of the liquid crystal molecules in the liquid crystal layer 03 are different upon observed from left and right sides, so that the color observed from left side is slightly different the color observed from right side, that is, the liquid crystal display panel may present blue upon observed from the left side and present yellow upon observed from right side; and therefore, the existing liquid crystal display panel has a phenomenon that colors respectively observed from the left and right viewing angles are different from each other, which may reduce image quality of the liquid crystal display device.

SUMMARY

According to embodiments of the disclosure, there is provided a liquid crystal display panel. The liquid crystal display panel comprises: an opposed substrate and an array substrate arranged opposite to each other, and a liquid crystal layer filled between the opposed substrate and the array substrate. Alignment films having opposite friction directions are provided on opposing surfaces of the opposed substrate and the array substrate, respectively. The liquid crystal display panel has a plurality of pixel units which are arranged in array, and each of the pixel units comprises two pixel regions along the friction direction of the alignment film. In each of the pixel units, a surface of the opposed substrate facing the liquid crystal layer or a surface of the array substrate facing the liquid crystal layer within at least one of the two pixel regions is inclined, so that a mean value of included angles between long axes of liquid crystal molecules in the liquid crystal layer within one of the two pixel regions and a horizontal plane where the opposed substrate and the array substrate are located and a mean value of included angles between long axes of liquid crystal molecules in the liquid crystal layer within the other of the two pixel regions and the horizontal plane where the opposed substrate and the array substrate are located has a same absolute value and a sum of zero.

For example, sizes of the two pixel regions in each of the pixel units are set to be equal to each other.

For example, in each of the pixel units, the surface of the opposed substrate facing the liquid crystal layer or the surface of the array substrate facing the liquid crystal layer within one of the two pixel regions is inclined, and a high point of the inclined surface is provided at a side of the alignment film where friction begins; and a tilt angle of the inclined surface with respect to the horizontal plane where the opposed substrate and the array substrate are located is 4 times as large as an included angle between long axes of the liquid crystal molecules near the inclined surface and the inclined surface.

For example, the tilt angle of the inclined surface is 4 degrees to 20 degrees.

For example, in each of the pixel units, the surface of the opposed substrate facing the liquid crystal layer and the surface of the array substrate facing the liquid crystal layer within one of the two pixel regions are inclined, and a high point of each inclined surface is provided at a side of the alignment film where friction begins; and a tilt angle of the inclined surface with respect to the horizontal plane where the opposed substrate and the array substrate are located is 2 times as large as an included angle between long axes of liquid crystal molecules near the inclined surface and the inclined surface.

For example, in each of the pixel units, the surface of the opposed substrate facing the liquid crystal layer within one of the two pixel regions is inclined and the surface of the array substrate facing the liquid crystal layer within the other of the two pixel regions is inclined, and a high point of each inclined surface is provided at a side of the alignment film where friction begins; and a tilt angle of the inclined surface with respect to the horizontal plane where the opposed substrate and the array substrate are located is 2 times as large as an included angle between long axes of liquid crystal molecules near the inclined surface and the inclined surface.

For example, the tilt angle of the inclined surface is 2 degrees to 10 degrees.

For example, the array substrate includes at least one film layer and the at least one film layer has a convex structure so that the surface of the array substrate facing the liquid crystal layer is inclined; and/or the opposed substrate includes at least one film layer and the at least one film layer has a convex structure so that the surface of the opposed substrate facing the liquid crystal layer is inclined.

For example, the film layer having the convex structure is an insulating layer, a semiconductor layer or a conductive layer.

For example, materials of the insulating layer include silicon nitride, silicon oxide or organic resin.

For example, in each of the pixel units, the high point of the inclined surface is located at the boundary of the two pixel regions, and the film layer in the pixel region without the inclined surface has a same height as the high point, so that the film layer is continuous in the two pixel regions.

According to the embodiments of the disclosure, there is provided a display device. The display device comprises the liquid crystal display panel described above.

According to the embodiments of the disclosure, there is provided a fabrication method of the liquid crystal display panel. The method comprises: forming a film layer on the array substrate or the opposed substrate; etching the film layer on the array substrate or the opposed substrate so that the film layer has a pattern of a continuous concave-convex structure; and etching other regions than a region where an inclined surface to be formed in the film layer having the pattern of the continuous concave-convex structure to remove the other regions than the region where the inclined surface to be formed, so that the film layer has the inclined surface.

For example, the method further comprises: forming an alignment film on the film layer having the inclined surface.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 2a to FIG. 2e are structural schematic views illustrating a liquid crystal display panel according to embodiments of the disclosure, in which FIG. 2b is an enlarged schematic view of a part C in FIG. 2a;

DETAILED DESCRIPTION

Figure 1:
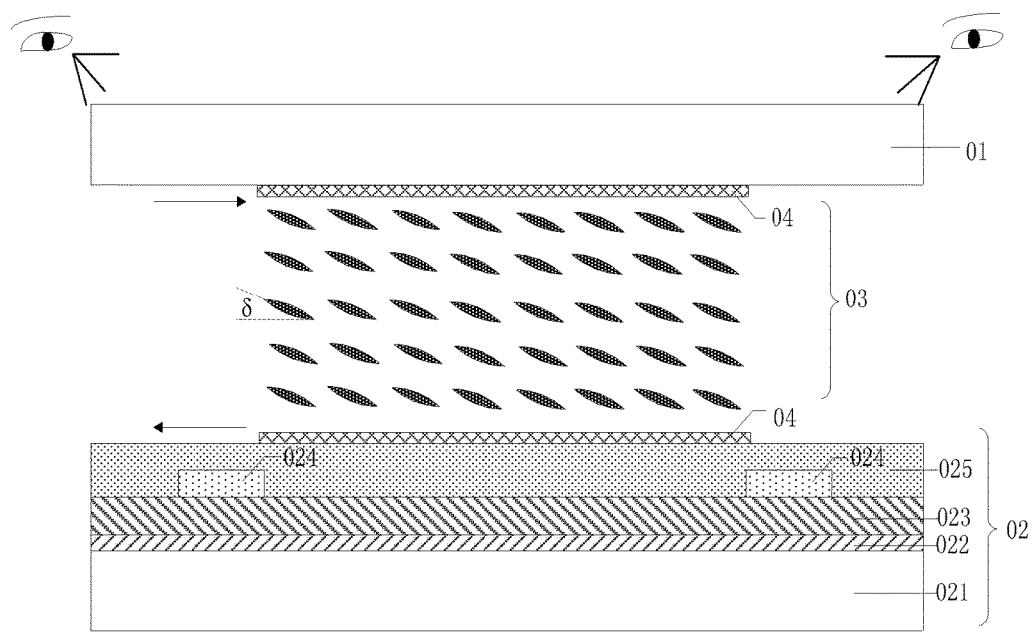
FIG. 1 is a structural schematic view illustrating an existing liquid crystal display panel.

In order to make objects, technical details and advantages of the embodiments of the disclosure apparent, the technical solutions of the embodiments of the disclosure will be described in a clearly and fully understandable way in connection with the drawings. It is obvious that the described embodiments are just a part but not all of the embodiments of the disclosure. Based on the described embodiments of the disclosure, those ordinarily skilled in the art can obtain other embodiment(s), without any inventive work, which should be within the protective scope of the disclosure.

Thicknesses and shapes in the drawings do not reflect true proportions of a liquid crystal display panel, but are only intended to illustrate some embodiments of the disclosure.

Figure 2A:
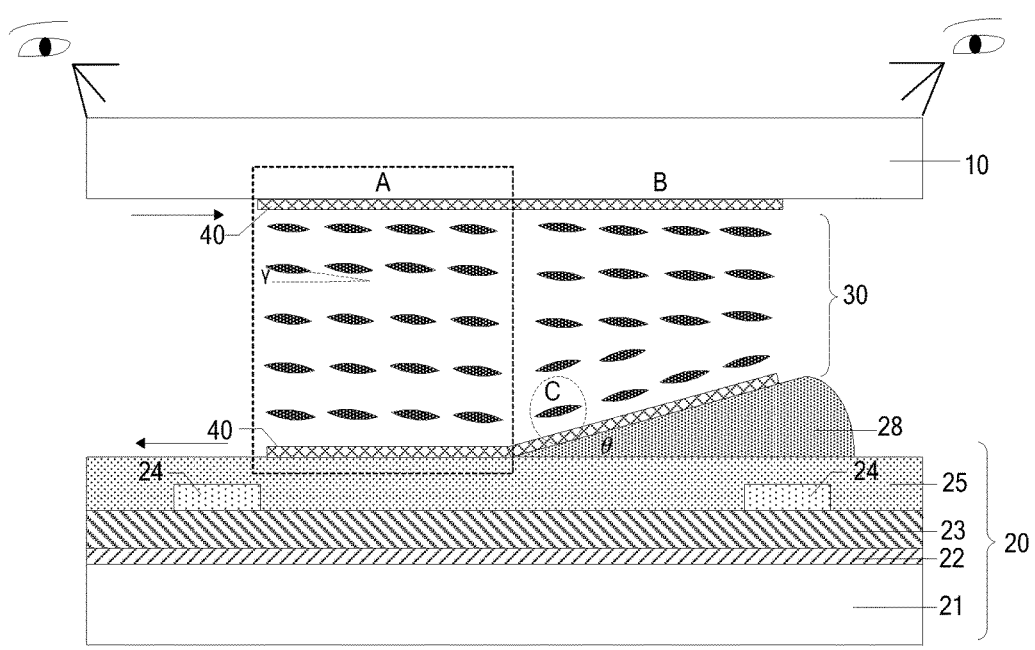

Embodiments of the disclosure provide a liquid crystal display panel. As shown in FIG. 2a, the liquid crystal display panel comprises: an opposed substrate 10 and an array substrate 20 arranged opposite to each other, and a liquid crystal layer 30 filled between the opposed substrate 10 and the array substrate 20. Alignment films 40 having opposite friction directions are provided on opposing surfaces of the opposed substrate 10 and the array substrate 20, respectively (arrows in FIG. 2a show the friction directions); in other words, an alignment film 40 is provided on a surface of the opposed substrate 10 facing the liquid crystal layer 30 and another alignment film 40 is provided on a surface of the array substrate 20 facing the liquid crystal layer 30, and a friction direction of the alignment film 40 provided on the surface of the opposed substrate 10 facing the liquid crystal layer 30 is opposite to a friction direction of the another alignment film 40 provided on the surface of the array substrate 20 facing the liquid crystal layer 30. The liquid crystal display panel has a plurality of pixel units which are arranged in array. For example, a plurality of gate lines and a plurality of data lines are provided on the array substrate, and the plurality of gate lines and the plurality of data lines intersect with each other to define the plurality of pixel units. It should be noted that, the liquid crystal display panel comprises a display region and a peripheral region surrounding the display region, and the plurality of pixel units which are arranged in array are provided in the display region.

Each of the pixel units for example comprises two pixel regions A and B along the friction direction of the alignment film 40, as shown in FIG. 2a.

In each of the pixel units, a surface of the opposed substrate 10 facing the liquid crystal layer or a surface of the array substrate 20 facing the liquid crystal layer within at least one of the two pixel regions is inclined, so that a mean value of included angles between long axes of liquid crystal molecules in the liquid crystal layer 30 within one of the two pixel regions and a horizontal plane where the opposed substrate 10 and the array substrate 20 are located and a mean value of included angles between long axes of liquid crystal molecules in the liquid crystal layer 30 within the other of the two pixel regions and the horizontal plane where the opposed substrate 10 and the array substrate 20 are located has a same absolute value and a sum of zero.

In an existing liquid crystal display panel, the included angles between long axes of liquid crystal molecules in the liquid crystal layer and the horizontal plane where the opposed substrate and the array substrate are located are arranged along a same direction, that is, the liquid crystal molecules only have one tilt state; and in this case, phase delays of the liquid crystal molecules in the liquid crystal layer are different upon observed from left and right sides, so that the color observed from left side is slightly different the color observed from right side, that is, the liquid crystal display panel may present blue upon observed from the left side and present yellow upon observed from right side. For example, the liquid crystal display panel according to the embodiments of the disclosure is provided to avoid the problem that the color observed from the left side is different from the color observed from the right side. In the liquid crystal display panel according to the embodiments of the disclosure, each pixel unit comprises two pixel regions along the friction direction of the alignment film; and furthermore, in each of the pixel units, the surface of the opposed substrate facing the liquid crystal layer or the surface of the array substrate facing the liquid crystal layer within at least one of the two pixel regions is inclined. For example, the surface of the opposed substrate facing the liquid crystal layer or the surface of the array substrate facing the liquid crystal layer within one of the two pixel regions is inclined; or, the surface of the opposed substrate facing the liquid crystal layer and the surface of the array substrate facing the liquid crystal layer within one of the two pixel regions are inclined; or, the surface of the opposed substrate facing the liquid crystal layer within one of the two pixel regions is inclined and the surface of the array substrate facing the liquid crystal layer within the other of the two pixel regions is inclined, as shown in FIGS. 2a, 2c-2e, 5e and 6-7. Because of the above-described inclined surfaces, the liquid crystal molecules in the liquid crystal layer have different tilt states within the two pixel regions, respectively; and the mean value of included angles between long axes of liquid crystal molecules in the liquid crystal layer within one of the two pixel regions and the horizontal plane where the opposed substrate and the array substrate are located and the mean value of included angles between long axes of liquid crystal molecules in the liquid crystal layer within the other of the two pixel regions and the horizontal plane where the opposed substrate and the array substrate are located has the same absolute value and the sum of zero. In this way, it can be ensured that the liquid crystal molecules in the liquid crystal layer have a same phase delay in the two pixel regions upon observed from the left and right viewing angles, and thus colors observed from the left and right viewing angles are same, characteristics of the viewing angles are further improved, and image quality of the liquid crystal display is improved.

For example, in the liquid crystal display panel according to the embodiments of the disclosure, in order to further ensure that the liquid crystal molecules in the liquid crystal layer within the two pixel regions A and B have an absolutely same phase delay upon observed from the left and right viewing angles, as shown in FIG. 2a, sizes of the two pixel regions A and B in each of the pixel units are set to be equal to each other, so that the phenomenon that different colors are observed from the left and right viewing angles due to different phase delays of part of the liquid crystal molecules in the liquid crystal layer is avoided.

Figure 2B:
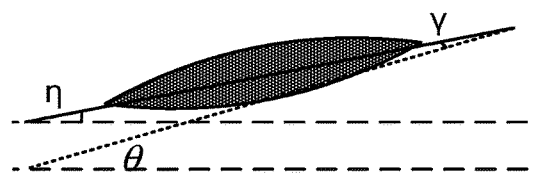

For example, in the liquid crystal display panel according to the embodiments of the disclosure, in order to ensure that the liquid crystal molecules in the liquid crystal layer respectively have different tilt states in the two pixel regions, a first implementation mode is employed as follows. In each of the pixel units, the surface of the opposed substrate facing the liquid crystal layer or the surface of the array substrate facing the liquid crystal layer within one of the two pixel regions is inclined, and a high point of the inclined surface is provided at a side of the alignment film where friction begins. For example, as shown in FIG. 2a, the surface of the array substrate facing the liquid crystal layer within the pixel region B is inclined, and the high point of the inclined surface is provided at the side of the alignment film 40 where friction begins. FIG. 2b is an enlarged schematic view illustrating Part C in FIG. 2a.

In addition, in order to ensure that the mean value of included angles between long axes of liquid crystal molecules in the liquid crystal layer within one of the two pixel regions and the horizontal plane where the opposed substrate and the array substrate are located and the mean value of included angles between long axes of liquid crystal molecules in the liquid crystal layer within the other of the two pixel regions and the horizontal plane where the opposed substrate and the array substrate are located has the same absolute value and the sum of zero, the following arrangements are employed in the first implementation mode. As shown in FIG. 2a and FIG. 2b, the surface of the array substrate 20 facing the liquid crystal layer 30 within the pixel region B is inclined, an included angle between the long axes of the liquid crystal molecules near the inclined surface and the inclined surface is $\gamma$, and a tilt angle $\theta$ of the inclined surface with respect to the horizontal plane where the array substrate 20 is located is set to be 4 times as large as the included angle between the long axes of the liquid crystal molecules near the inclined surface in the liquid crystal layer 30 and the inclined surface, that is, the tilt angle $\theta$ of the inclined surface with respect to the horizontal plane where the opposed substrate 10 or the array substrate 20 is located is $4\gamma$ ($\theta=4\gamma$). In the case that the tilt angle $\theta$ of the inclined surface with respect to the horizontal plane where the array substrate 20 is located is $4\gamma$, an included angle $\eta$ between the long axes of the liquid crystal molecules near the inclined surface and the horizontal plane where the array substrate 20 is located is $3\gamma$. Furthermore, in the pixel region B, an included angle between the long axes of the liquid crystal molecules near a surface of the opposed substrate and the horizontal plane where the opposed substrate 10 is located is $-\gamma$. Accordingly, the mean value of the included angles between the long axes of the liquid crystal molecules in the pixel region B and the horizontal plane is $(-\gamma+3\gamma)/2=\gamma$, so as to offset the included angel $-\gamma$ between the long axes of the liquid crystal molecules and the horizontal plane where the array substrate 20 is located within the pixel region A. That is, the mean value of included angles between long axes of liquid crystal molecules in the liquid crystal layer within the pixel region B and the horizontal plane where the opposed substrate and the array substrate are located and the mean value of included angles between long axes of liquid crystal molecules in the liquid crystal layer within the pixel region A and the horizontal plane where the opposed substrate and the array substrate are located has the same absolute value and the sum of zero., i.e., the included angles within the two pixel regions offset each other.

Figure 2C:
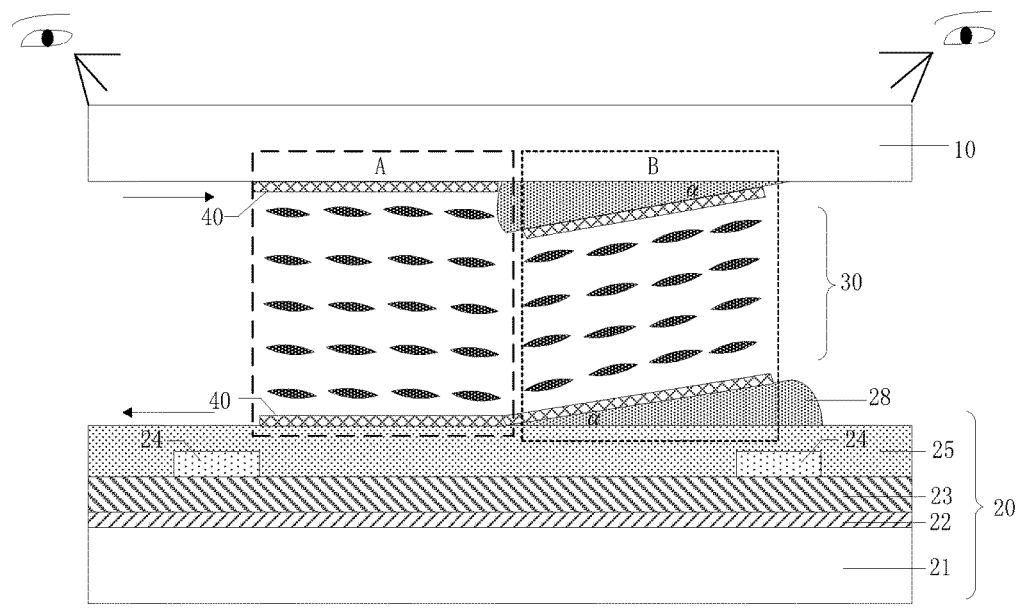
Figure 2D:
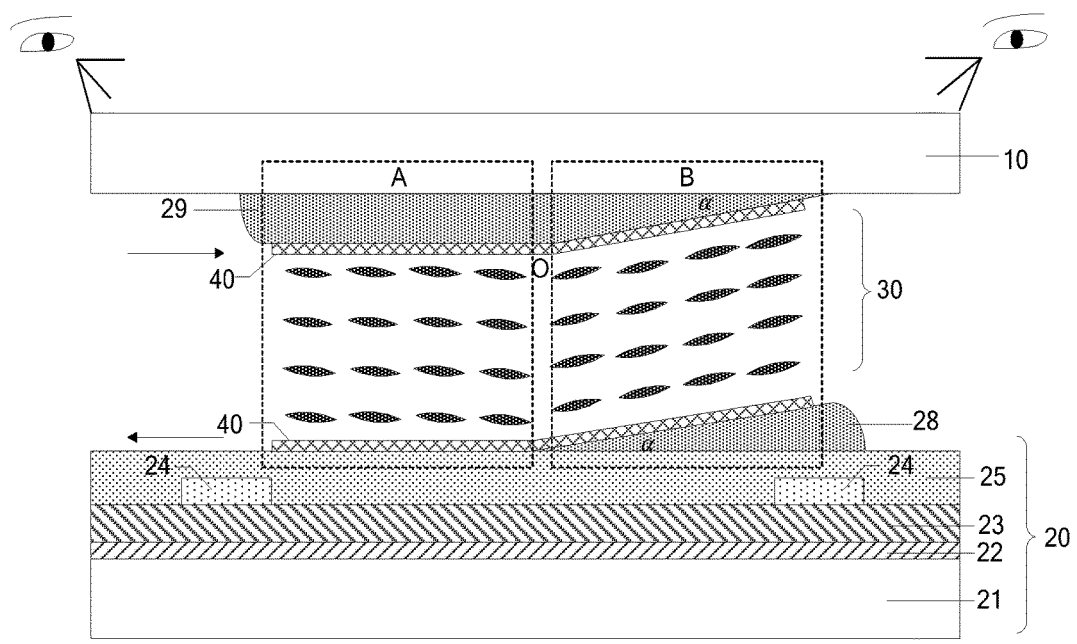

For example, in the liquid crystal display panel according to the embodiments of the disclosure, in order to ensure that the liquid crystal molecules in the liquid crystal layer respectively have different tilt states in the two pixel regions, a second implementation mode is provided as follows. In each of the pixel units, the surface of the opposed substrate facing the liquid crystal layer and the surface of the array substrate facing the liquid crystal layer within one of the two pixel regions are inclined, and the high point of each inclined surface is provided at the side of the alignment film where friction begins. As shown in FIG. 2c and FIG. 2d, the surface of the opposed substrate 10 facing the liquid crystal layer 30 and the surface of the array substrate 20 facing the liquid crystal layer 30 within the pixel region B are inclined, and the high point of each inclined surface is provided at the side of the alignment film where friction begins.

For example, in order to ensure that the mean value of included angles between long axes of liquid crystal molecules in the liquid crystal layer within one of the two pixel regions and the horizontal plane where the opposed substrate and the array substrate are located and the mean value of included angles between long axes of liquid crystal molecules in the liquid crystal layer within the other of the two pixel regions and the horizontal plane where the opposed substrate and the array substrate are located has the same absolute value and the sum of zero, the following arrangements are employed in the second implementation mode. As shown in FIG. 2c and FIG. 2d, the surface of the opposed substrate 10 facing the liquid crystal layer 30 and the surface of the array substrate 20 facing the liquid crystal layer 30 within the pixel region B are inclined, an included angle between the long axes of the liquid crystal molecules near the inclined surface in the liquid crystal layer 30 and the inclined surface is $\gamma$, and a tilt angle $\alpha$ of the inclined surface with respect to the horizontal plane where the opposed substrate 10 and the array substrate 20 are located is set to be 2 times as large as the included angle between the long axes of the liquid crystal molecule near the inclined surface in the liquid crystal layer 30 and the inclined surface, that is, the tilt angle $\alpha$ of the inclined surface with respect to the horizontal plane where the opposed substrate 10 and the array substrate 20 are located is $2\gamma$ ($\alpha=2\gamma$). In the case that the tilt angle $\alpha$ of the inclined surface with respect to the horizontal plane where the opposed substrate 10 and the array substrate 20 are located is $2\gamma$, the included angle between the long axes of the liquid crystal molecules near the inclined surface and the horizontal plane where the opposed substrate 10 and the array substrate 20 are located is $\gamma$, and the mean value of the included angles between the long axes of the liquid crystal molecules in the pixel region B and the horizontal plane is $(\gamma+\gamma)/2=\gamma$, so as to offset the included angel $-\gamma$ between the long axes of the liquid crystal molecules in the pixel region A and the horizontal plane where the array substrate 20 is located. That is, the mean value of included angles between long axes of liquid crystal molecules in the liquid crystal layer within the pixel region B and the horizontal plane where the opposed substrate and the array substrate are located and the mean value of included angles between long axes of liquid crystal molecules in the liquid crystal layer within the pixel region A and the horizontal plane where the opposed substrate and the array substrate are located has the same absolute value and the sum of zero., i.e., the included angles within the two pixel regions A and B offset each other. It can be seen that, a sum of the tilt angle of the inclined surface of the opposed substrate 10 and the tilt angle of the inclined surface of the array substrate 20 is 4 times as large as the included angle between the long axes of the liquid crystal molecules near the inclined surface and the inclined surface, i.e., $\alpha+\alpha=4\gamma$.

Figure 2E:
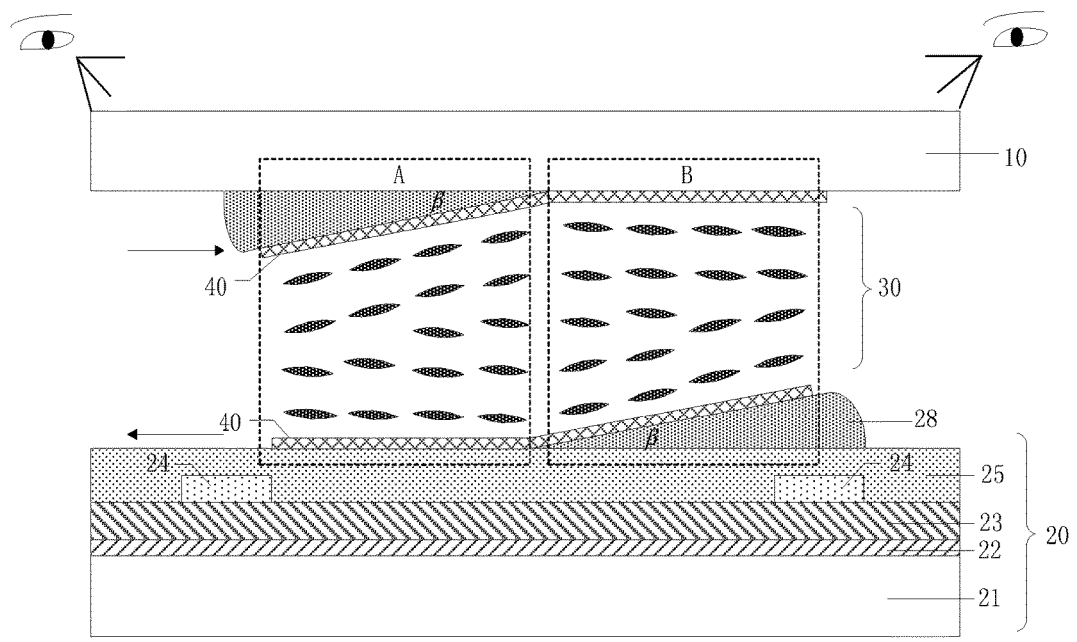

For example, in the liquid crystal display panel according to the embodiments of the disclosure, in order to ensure that the liquid crystal molecules in the liquid crystal layer respectively have different tilt states in the two pixel regions, a third implementation mode is provided as follows. In each of the pixel units, the surface of the opposed substrate facing the liquid crystal layer within one of the two pixel regions is inclined and the surface of the array substrate facing the liquid crystal layer within the other of the two pixel regions is inclined, and the high point of each inclined surface is provided at the side of the alignment film where friction begins. As shown in FIG. 2e, the surface of the opposed substrate 10 facing the liquid crystal layer 30 within the pixel region A is inclined and the surface of the array substrate 20 facing the liquid crystal layer 30 within the pixel region B is inclined, and the high point of each inclined surface is provided at the side of the alignment film 40 where friction begins.

In addition, in order to ensure that the mean value of included angles between long axes of liquid crystal molecules in the liquid crystal layer within one of the two pixel regions and the horizontal plane where the opposed substrate and the array substrate are located and the mean value of included angles between long axes of liquid crystal molecules in the liquid crystal layer within the other of the two pixel regions and the horizontal plane where the opposed substrate and the array substrate are located has the same absolute value and the sum of zero, the following arrangements are employed in the third implementation mode. The tilt angle $\beta$ of the inclined surface with respect to the horizontal plane where the opposed substrate 10 and the array substrate 20 are located is set to be 2 times as large as the included angle between the long axes of the liquid crystal molecules near the inclined surface in the liquid crystal 30 and the inclined surface.

In the three implementation modes as described above, as compared with the first implementation mode, the second implementation mode and the third implementation mode make the liquid crystal molecules in the liquid crystal layer have different tilt states in the two pixel regions A and B in a better way; however, fabrication processes of the second implementation mode and the third implementation mode are more complex. In practical applications, the implementation mode is selected according to actual requirements, which is not limited here.

As shown in FIG. 2a, the tilt angle of the inclined surface is se to be 4 times as large as the included angle between the long axes of the liquid crystal molecule near the inclined surface and the inclined surface. Because the included angle between the long axes of the liquid crystal molecules near the inclined surface and the inclined surface is a pre-tilt angle of the liquid crystal molecules and for example is set to be 1 degree to 5 degrees, the tilt angle of the inclined surface with respect to the horizontal plane where the opposed substrate and the array substrate are located is set to be 4 degrees to 20 degrees.

As shown in FIG. 2c to FIG. 2e, the tilt angle of the inclined surface is set to be 2 times as large as the included angle between the long axes of the liquid crystal molecules near the inclined surface and the inclined surface. Because the included angle between the long axes of the liquid crystal molecules near the inclined surface and the inclined surface is the pre-tilt angle of the liquid crystal molecules and for example is set to be 1 degree to 5 degrees, the tilt angle of the inclined surface with respect to the horizontal plane where the opposed substrate and the array substrate are located is set to be 2 degrees to 10 degrees.

Figure 6:
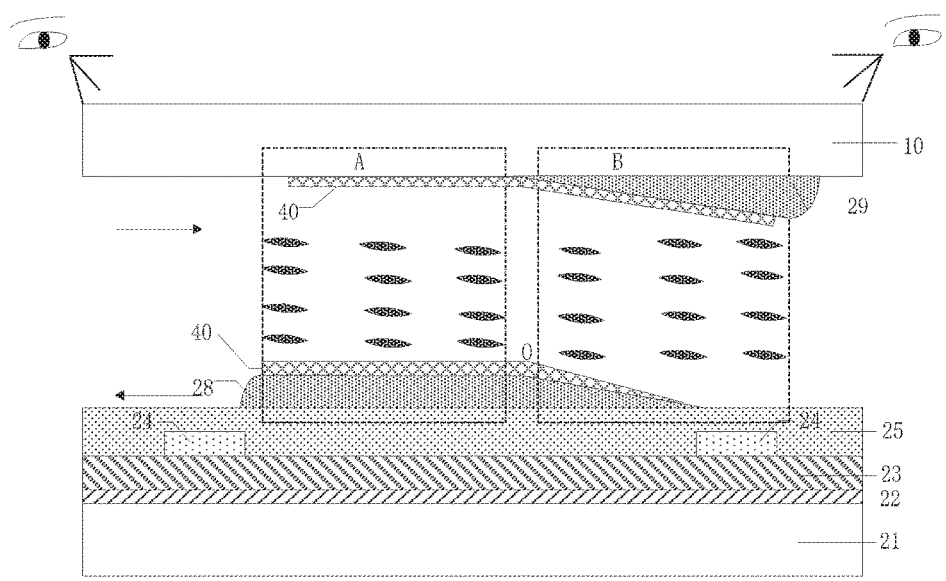
FIG. 6 is a schematically structural views illustrating a liquid crystal display panel according to an embodiment of the disclosure.
Figure 7:
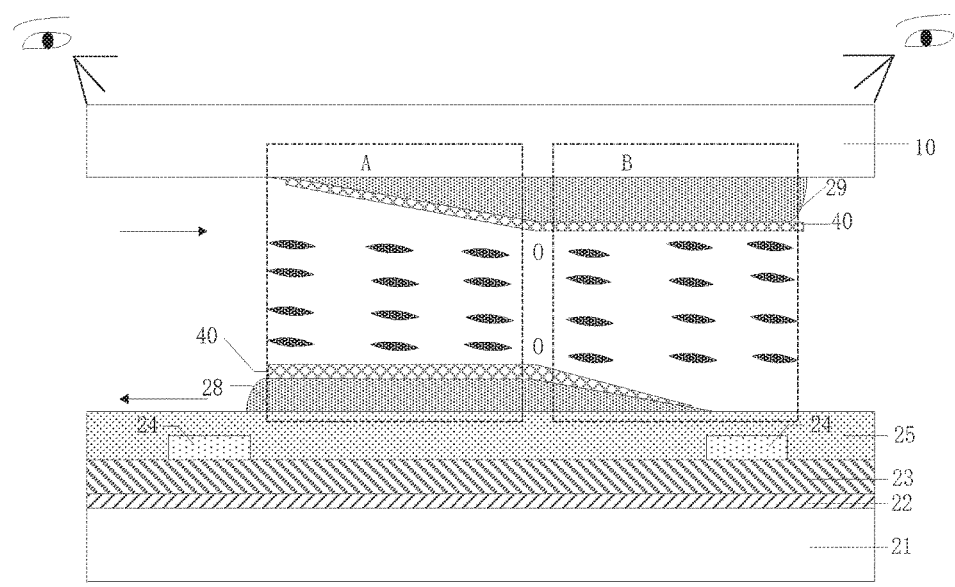
FIG. 7 is a schematically structural view illustrating a liquid crystal display panel according to an embodiment of the disclosure.

For example, in the liquid crystal display panel according to the embodiments of the disclosure, in order to make the array substrate have the inclined surface, the array substrate includes at least one film layer and the at least one film layer has a convex structure so that the surface of the array substrate facing the liquid crystal layer within one of the two pixel regions is inclined, as shown in FIG. 2a. For example, a planarization layer of the array substrate 20 has the convex structure 28 so that the surface of the array substrate facing the liquid crystal layer within one of the two pixel regions is inclined, as also shown in FIGS. 6-7. Similarly, there may be other film layers having the convex structure for generating the inclined surface, which will not be repeated here.

For example, in order to make the opposed substrate have the inclined surface, the opposed substrate includes at least one film layer and the at least one film layer has a convex structure so that the surface of the opposed substrate facing the liquid crystal layer within one of the two pixel regions is inclined. As shown in FIGS. 2d and 6-7, a planarization layer of the opposed substrate 10 has the convex structure 29 so that the surface of the opposed substrate facing the liquid crystal layer within one of the two pixel regions is inclined. Similarly, there may be other film layers having the convex structure for generating the inclined surface, which will not be repeated here.

In the liquid crystal display panel according to the embodiments of the disclosure, the film layer having the convex structure may be an insulating layer, a semiconductor layer or a conductive layer, i.e., materials of the convex structure may be materials of the insulating layer, materials of the semiconductor layer or materials of the conductive layer. For example, the materials of the semiconductor layer include a-Si or IGZO, etc.; the materials of the conductive layer include metal aluminum, metal copper, ITO or IZO, etc.; and the materials of the insulating layer include silicon nitride, silicon oxide or organic resin, etc.

In the liquid crystal display panel according to embodiments of the disclosure, as shown in FIG. 2d and FIG. 6-FIG. 7, in each of the pixel units, the high point O of the inclined surface is located at the boundary of the two pixel regions, and the film layer in the pixel region without the inclined surface has a same height as the high point O, so that the film layer is continuous in the two pixel regions A and B, and such continuous film layer having the inclined surface reduces light leakage in the middle portion of each pixel unit.

For example, the array substrate of the liquid crystal display panel according to the embodiments of the disclosure is further provided with other film layer structures such as an active layer, a pixel electrode layer, an insulating layer and a common electrode layer and so on, and is formed with structures such as a thin film transistor, a gate line and a data line and so on; these specific structures can be implemented in a variety of ways, which will not be limited here.

The embodiments of the disclosure further provide a fabrication method of the liquid crystal display panel according to the embodiment of the disclosure; since the method solves problems on a principle similar to that of the liquid crystal display panel described above, the implementation of the method can be referred to implementation of the liquid crystal display panel, and repeated parts will not be given here.

Figure 3:
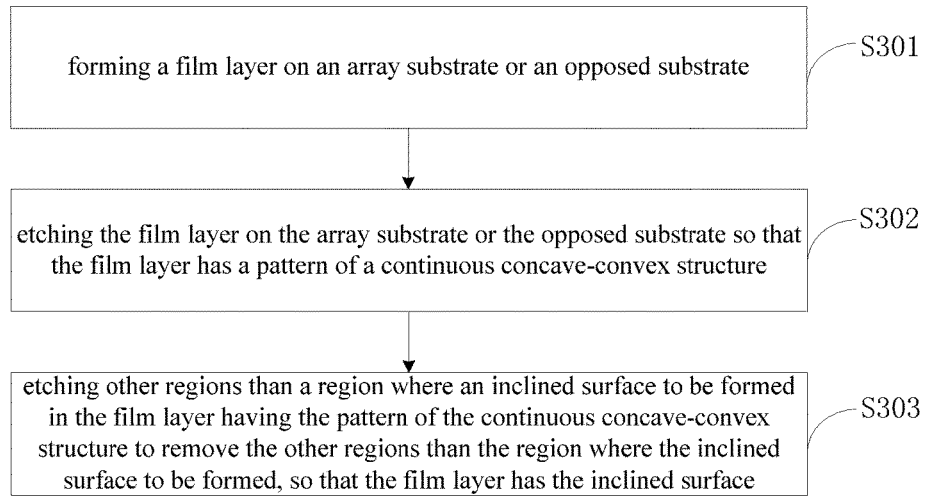
FIG. 3 is a flow chart of a fabrication method of a liquid crystal display panel according to the embodiments of the disclosure.

For example, as shown in FIG. 3, the fabrication method of the liquid crystal display panel according to the embodiments of the disclosure comprises the following steps.

S301: forming a film layer on an array substrate or an opposed substrate;

S302: etching the film layer on the array substrate or the opposed substrate so that the film layer has a pattern of a continuous concave-convex structure;

S303: etching other regions than a region where an inclined surface to be formed in the film layer having the pattern of the continuous concave-convex structure to remove the other regions than the region where the inclined surface to be formed, so that the film layer has the inclined surface.

For example, the etching in step 302 is a slow etching, and a transverse etching speed is greater than a longitudinal etching speed. For example, the etching in step 303 is a fast etching, and a transverse etching speed is less than a longitudinal etching speed.

For example, after step 303 is performed, the fabrication method of the liquid crystal display panel according to the embodiments of the disclosure further comprises: forming an alignment film on the film layer having the inclined surface.

Figure 4:
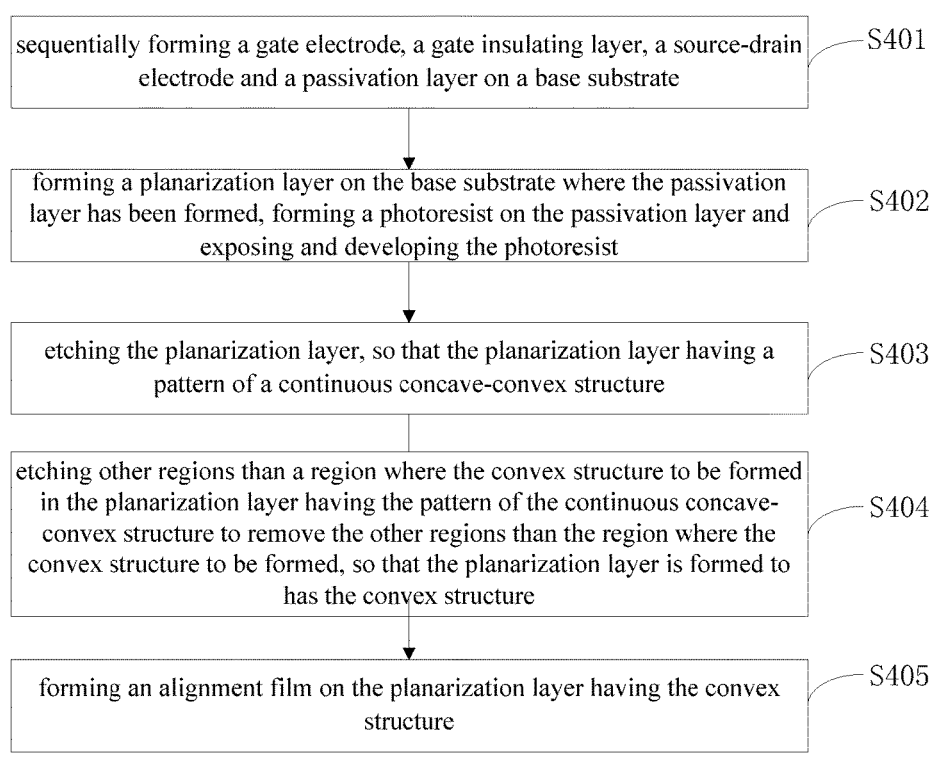
FIG. 4 is a flow chart of a fabrication method of an array substrate of the liquid crystal display panel according to the embodiments of the disclosure.

Hereinafter, the fabrication method of the array substrate of the liquid crystal display panel according to the embodiments of the disclosure will be described by in more detail. As shown in FIG. 4, the method comprises the following steps.

Figure 5A:
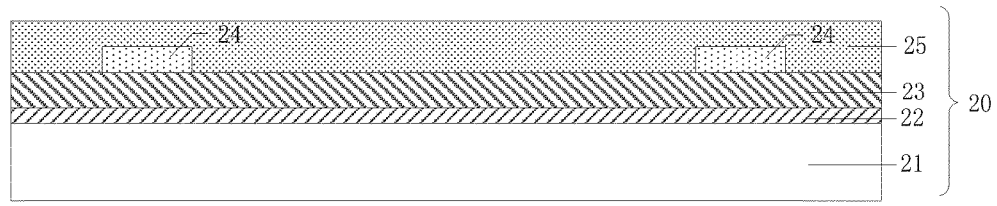
FIG. 5a to FIG. 5e are structural schematic views during the fabrication method of the array substrate of the liquid crystal display panel according to the embodiments of the disclosure.

S401: sequentially forming a gate electrode, a gate insulating layer, a source-drain electrode and a passivation layer on a base substrate;

For example, as shown in FIG. 5a, the gate electrode 22 and the gate insulating layer 23 are sequentially formed on the base substrate 21 at first, and then the source-drain electrode 24 insulated from the gate electrode 22 is formed on the base substrate where the gate insulating layer 23 has been formed and the source-drain electrode 24 comprises a source electrode and a drain electrode provided opposite to each other, and finally a passivation layer 25 is formed on the source-drain electrode 24.

S402: forming a planarization layer on the base substrate where the passivation layer has been formed, forming a photoresist on the passivation layer and exposing and developing the photoresist.

Figure 5B:
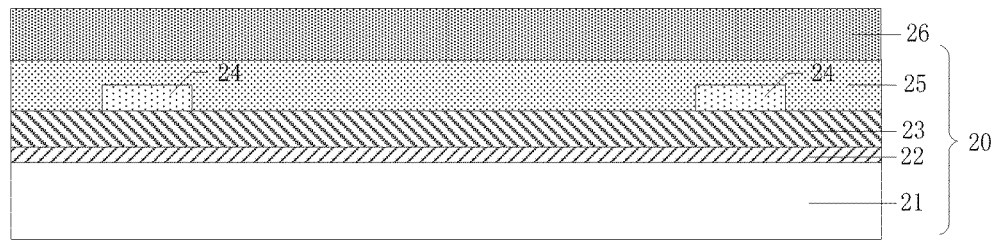

For example, as shown in FIG. 5b, the planarization layer 26 is formed. A photoresist (not shown) is formed on the passivation layer 26. After the photoresist is exposed and developed, an opening portion of the photoresist is formed, and the opening portion of the photoresist corresponds to regions except a convex structure to be formed.

S403: etching the planarization layer, so that the planarization layer having a pattern of a continuous concave-convex structure.

Figure 5C:
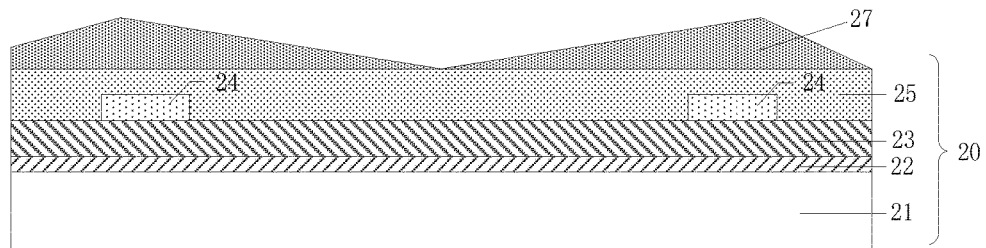
Figure 5D:
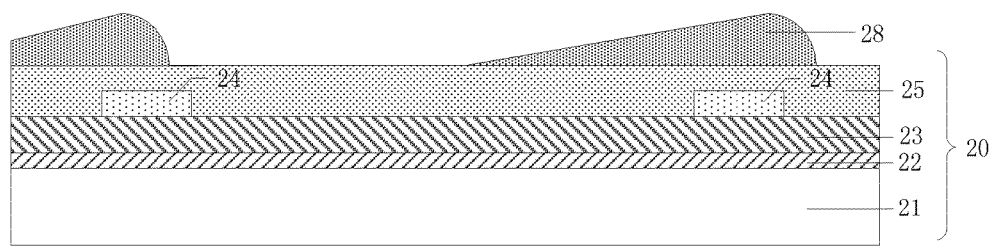

For example, the exposed and developed photoresist is used as a mask, to etch the planarization layer. The etching process is controlled so that the transverse etching speed is greater than the longitudinal etching speed and a width of transverse etching is greater than the opening portion of the photoresist. As shown in FIG. 5c, in each of the pixel units, the planarization layer is formed to have the pattern of the continuous concave-convex structure 27.

For example, a slow etching is performed, to form the planarization layer having the pattern of the continuous concave-convex structure 27.

S404: etching other regions than a region where the convex structure to be formed in the planarization layer having the pattern of the continuous concave-convex structure to remove the other regions than the region where the convex structure to be formed, so that the planarization layer is formed to has the convex structure.

For example, other regions than the region where the convex structure to be formed in the planarization layer having the pattern of the continuous concave-convex structure is fast etched to remove the other regions than the region where the convex structure to be formed, so that the planarization layer is formed to has the convex structure 28.

S405: forming an alignment film on the planarization layer having the convex structure.

Figure 5E:
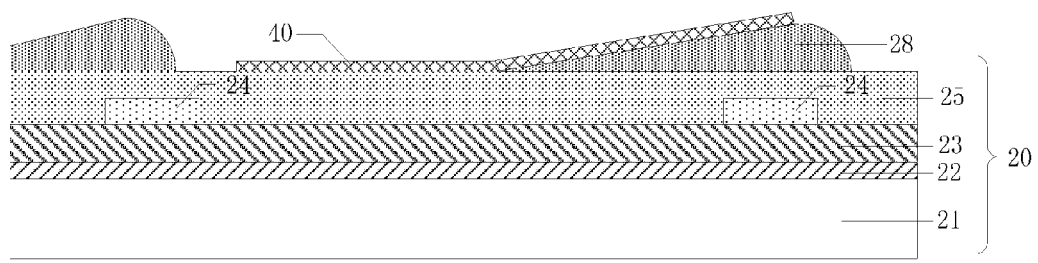

As shown in FIG. 5e, the alignment film 40 is formed on the planarization layer where the convex structure 28 has been formed.

In addition, in a process of fabricating the array substrate, it may be fabricated other film layers such as an active layer, a pixel electrode layer, an insulating layer and a common electrode layer and so on, and other structures such as a thin film transistor, a gate line and a data line and so on, which is not repeated here.

As described above, the array substrate of the liquid crystal display panel according to the embodiments of the disclosure is fabricated through steps S401 to S405.

The embodiments of the disclosure further provide a display device. The display device comprises the above-described liquid crystal display panel according to the embodiments of the disclosure. For example, the display device may be: a mobile phone, a tablet personal computer, a television, a monitor, a laptop, a digital photo frame, a navigator, or any other product or component having a display function. For the other essential components of the display device, those ordinarily skilled in the art should understand as that there are the same, which will not be repeated here, and should not be a limitation to the disclosure. For implementation of the display device, the embodiments of the above-described liquid crystal display panel can be referred to, and repeated sessions will not be illustrated here.

The foregoing embodiments merely are exemplary embodiments of the disclosure, and not intended to define the scope of the disclosure, and the scope of the disclosure is determined by the appended claims.

The present application claims priority of Chinese Patent Application No. 201410806465.6 filed on Dec. 19, 2014, the disclosure of which is incorporated herein by reference in its entirety as part of the present application.

The invention claimed is:

1. A liquid crystal display panel, comprising: an opposed substrate and an array substrate arranged opposite to each other, and a liquid crystal layer filled between the opposed substrate and the array substrate, wherein,
   alignment films having opposite friction directions are provided on opposing surfaces of the opposed substrate and the array substrate, respectively;
   the liquid crystal display panel has a plurality of pixel units which are arranged in array, and each of the pixel units comprises two pixel regions along the friction direction of the alignment film;
   in each of the pixel units, a surface of the opposed substrate facing the liquid crystal layer or a surface of the array substrate facing the liquid crystal layer within at least one of the two pixel regions is inclined, so that a mean value of included angles between long axes of liquid crystal molecules in the liquid crystal layer within one of the two pixel regions and a horizontal plane where the opposed substrate and the array substrate are located and a mean value of included angles between long axes of liquid crystal molecules in the liquid crystal layer within the other of the two pixel regions and the horizontal plane where the opposed substrate and the array substrate are located has a same absolute value and a sum of zero, wherein
   in each of the pixel units, the inclined surface includes a high point located at the boundary of the two pixel regions, and the film layer in the pixel region without the inclined surface has a same height as the high point, so that the film layer is continuous in the two pixel regions.

2. The liquid crystal display panel according to claim 1, wherein
   sizes of the two pixel regions in each of the pixel units are set to be equal to each other.

3. The liquid crystal display panel according to claim 2, wherein
   in each of the pixel units, the surface of the opposed substrate facing the liquid crystal layer or the surface of the array substrate facing the liquid crystal layer within one of the two pixel regions is inclined, and a high point of the inclined surface is provided at a side of the alignment film where friction begins; and
   a tilt angle of the inclined surface with respect to the horizontal plane where the opposed substrate and the array substrate are located is 4 times as large as an included angle between long axes of the liquid crystal molecules near the inclined surface and the inclined surface.

4. The liquid crystal display panel according to claim 3, wherein
   the tilt angle of the inclined surface is 4 degrees to 20 degrees.

5. The liquid crystal display panel according to claim 2, wherein
   in each of the pixel units, the surface of the opposed substrate facing the liquid crystal layer and the surface of the array substrate facing the liquid crystal layer within one of the two pixel regions are inclined, and a high point of each inclined surface is provided at a side of the alignment film where friction begins; and
   a tilt angle of the inclined surface with respect to the horizontal plane where the opposed substrate and the array substrate are located is 2 times as large as an included angle between long axes of liquid crystal molecules near the inclined surface and the inclined surface.

6. The liquid crystal display panel according to claim 2, wherein
   in each of the pixel units, the surface of the opposed substrate facing the liquid crystal layer within one of the two pixel regions is inclined and the surface of the array substrate facing the liquid crystal layer within the other of the two pixel regions is inclined, and a high point of each inclined surface is provided at a side of the alignment film where friction begins; and
   a tilt angle of the inclined surface with respect to the horizontal plane where the opposed substrate and the array substrate are located is 2 times as large as an included angle between long axes of liquid crystal molecules near the inclined surface and the inclined surface.

7. The liquid crystal display panel according to claim 5, wherein
   the tilt angle of the inclined surface is 2 degrees to 10 degrees.

8. A display device, comprising the liquid crystal display panel according to claim 1.

9. A fabrication method of the liquid crystal display panel according to claim 1, comprising:
   forming a film layer on the array substrate or the opposed substrate;

etching the film layer on the array substrate or the opposed substrate so that the film layer has a pattern of a continuous concave-convex structure; and etching other regions than a region where an inclined surface to be formed in the film layer having the pattern of the continuous concave-convex structure to remove the other regions than the region where the inclined surface to be formed, so that the film layer has the inclined surface within at least one of the two pixel regions of each of the pixel units to include a high point located at the boundary of the two pixel regions, and the film layer in the pixel region without the inclined surface has a same height as the high point, so that the film layer is continuous in the two pixel regions.

10. The method according to claim 9, further comprising: forming an alignment film on the film layer having the inclined surface.

11. The liquid crystal display panel according to claim 6 wherein,
the tilt angle of the inclined surface is 2 degrees to 10 degrees.

12. The liquid crystal display panel according to claim 1, wherein
the array substrate includes at least one film layer and the at least one film layer has a convex structure to allow the surface of the array substrate on the at least one film layer, facing the liquid crystal layer, to be inclined; and
the opposed substrate includes at least one film layer and the at least one film layer has a convex structure to allow the surface of the opposed substrate on the at least one film layer, facing the liquid crystal layer, to be inclined.

13. The liquid crystal display panel according to claim 12, wherein
the film layer having the convex structure is an insulating layer, a semiconductor layer or a conductive layer.

14. The liquid crystal display panel according to claim 13, wherein
materials of the insulating layer include silicon nitride, silicon oxide or organic resin.

15. A liquid crystal display panel, comprising: an opposed substrate and an array substrate arranged opposite to each other, and a liquid crystal layer filled between the opposed substrate and the array substrate, wherein,
alignment films having opposite friction directions are provided on opposing surfaces of the opposed substrate and the array substrate, respectively;
the liquid crystal display panel has a plurality of pixel units which are arranged in array, and each of the pixel units comprises two pixel regions along the friction direction of the alignment film;
in each of the pixel units, a surface of the opposed substrate facing the liquid crystal layer or a surface of the array substrate facing the liquid crystal layer within at least one of the two pixel regions is inclined, so that a mean value of included angles between long axes of liquid crystal molecules in the liquid crystal layer within one of the two pixel regions and a horizontal plane where the opposed substrate and the array substrate are located and a mean value of included angles between long axes of liquid crystal molecules in the liquid crystal layer within the other of the two pixel regions and the horizontal plane where the opposed substrate and the array substrate are located has a same absolute value and a sum of zero wherein
the array substrate includes at least one film layer and the at least one film layer has a convex structure to allow the surface of the array substrate on the at least one film layer, facing the liquid crystal layer, to be inclined; or
the opposed substrate includes at least one film layer and the at least one film layer has a convex structure to allow the surface of the opposed substrate on the at least one film layer, facing the liquid crystal layer, to be inclined; and
wherein in each of the pixel units, the inclined surface includes a high point located at the boundary of the two pixel regions, and the film layer in the pixel region without the inclined surface has a same height as the high point, so that the film layer is continuous in the two pixel regions.

16. The liquid crystal display panel according to claim 15, wherein
the film layer having the convex structure is an insulating layer, a semiconductor layer or a conductive layer.

17. The liquid crystal display panel according to claim 16, wherein
materials of the insulating layer include silicon nitride, silicon oxide or organic resin.

18. The liquid crystal display panel according to claim 15, wherein
sizes of the two pixel regions in each of the pixel units are set to be equal to each other.

19. The liquid crystal display panel according to claim 18, wherein
in each of the pixel units, the surface of the opposed substrate facing the liquid crystal layer or the surface of the array substrate facing the liquid crystal layer within one of the two pixel regions is inclined, and a high point of the inclined surface is provided at a side of the alignment film where friction begins; and
a tilt angle of the inclined surface with respect to the horizontal plane where the opposed substrate and the array substrate are located is 4 times as large as an included angle between long axes of the liquid crystal molecules near the inclined surface and the inclined surface.

20. The liquid crystal display panel according to claim 19, wherein the tilt angle of the inclined surface is 4 degrees to 20 degrees.

* * * * *